Oct. 2, 1951 J. W. SMITH 2,569,834
ARMREST
Filed Oct. 28, 1949
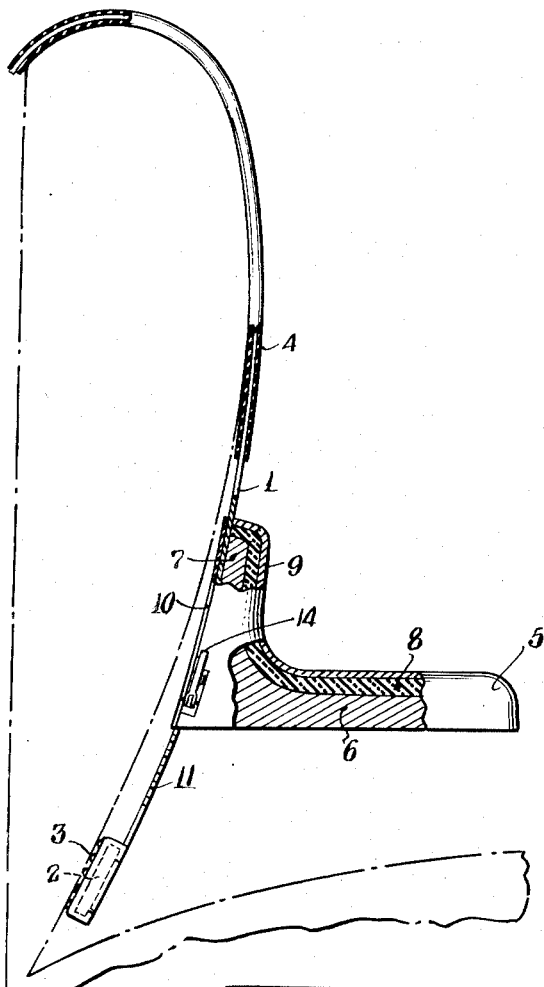
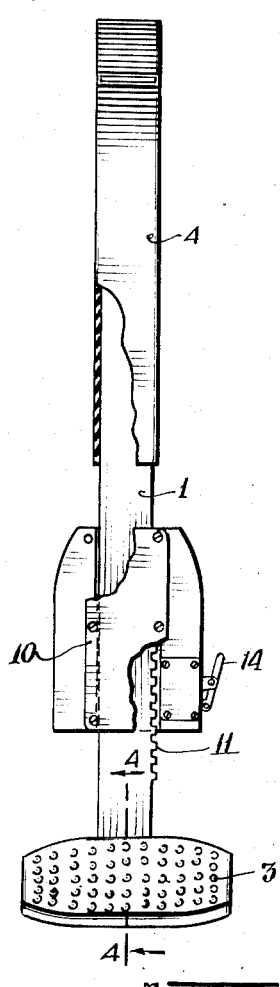
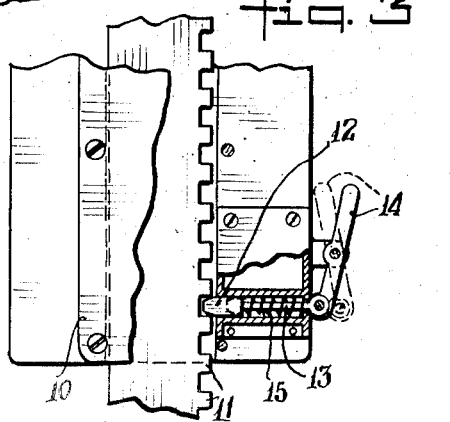
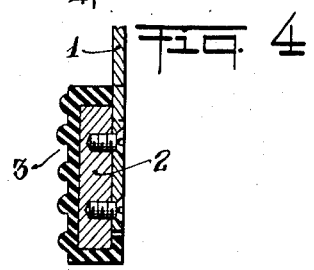
INVENTOR.
James W. Smith
BY
E. V. Hardway
ATTORNEY Patented Oct. 2, 1951

2,569,834

UNITED STATES PATENT OFFICE 2,569,834

ARMREST

James W. Smith, Austin, Tex.

Application October 28, 1949, Serial No. 124,145

6 Claims. (Cl. 155—112)

This invention relates to an arm rest.

The invention has been particularly designed for use in a motor vehicle as a support for the arm of the driver.

In motor vehicles of the passenger type there is usually one fixed arm rest, but the vehicle is not equipped with a rest for the other arm.

It is an object of the present invention to provide a support for the arm, which support may be adjusted to suit the particular driver and may be readily removed when not in use.

The arm rest herein described will readily move laterally and is of light weight so that the driver is not liable to become injured by it in case of a vehicle accident.

Other objects and advantages will be apparent from the following specification, which is illustrated by the accompanying drawings, wherein:

Figure 1 is a side view of the arm rest, partly in section;

Figure 2 is a rear view thereof;

Figure 3 is an enlarged, fragmentary, rear view, partly broken away; and

Figure 4 is a sectional view taken on the line 4—4 of Figure 2.

Referring now more particularly to the drawings, the numeral 1 designates a hanger, which, in the present illustration, is composed of a metal strap which is curved rearwardly at its upper end to engage over the back of the front seat. The lower end of this strap extends down well to the bottom cushion of the front seat. Screwed on to the lower end of the hanger, at the rear, there is a block, preferably a metal block 2, and this block is covered over by a suitable soft type of rubber 3. The rear face of this rubber is suitably roughened so as to give it a gripping surface, and the block is elongated each way so as to provide the necessary amount of surface. This block rests against the back of the front seat and holds the strap 1 away from the material of said seat so that it will not be injured.

The block 2 is elongated endwise so as to provide the required amount of gripping surface to hold the arm support steady, and it also spaces the hanger away from the upholstery of the back to prevent injury thereto.

The hanger 1 is formed of a strong, flexible material, but it is of such material that its contour, or curvature, may be changed so as to conform to the particular shape of the back of the vehicle seat to which it is applied.

The upper end of the hanger is curved to conform to the curvature of the top of the seat back, and is, preferably, covered with a sleeve 4 of soft material, such as rubber, that will not injure the upholstery by friction thereagainst.

The numeral 5 designates the arm support generally. This support is L-shaped, having the outstanding arm 6 and the upstanding arm 7. These arms are composed of suitable rigid material, such as wood or metal, and are covered with soft material such as sponge rubber 8, which in turn may be covered with any selected upholstery material, as 9.

The outstanding portion of the arm support forms a rest for the forearm, while the upstanding portion forms a support and rest for the elbow, both of which are very desirable for the comfort of the driver.

The rear side of the arm support has a wide, vertical groove to receive the hanger 1 snugly, as indicated in Figure 2, and fitted over the rear surface of the upstanding portion of the support, and following the curvature thereof, there is a plate 10 which may be secured in place by screws and which retains the support on the hanger but allows it to be adjusted up and down.

This portion of the hanger has a serrated margin 11, and mounted in the adjacent portion of the upstanding arm 7 there is a latch mechanism consisting of a latch 12 having a stem 13 extending outwardly and to the outer end of which one end of a lever 14 is pivoted. By depressing the free end of said lever, the latch may be disengaged from the teeth 11 and the arm support adjusted up or down.

The lever 14 may then be released and a pressure spring 15 on the stem 13 will force the latch into engagement with the opposing teeth and hold it locked firmly in place until again released.

It is obvious that for short trips or other conditions where the support is not necessary it may be readily removed and kept at a more convenient place in the vehicle.

The drawings and description are illustrative merely, while the broad principle of the invention will be defined by the appended claims.

What I claim is:

1. An arm rest comprising, a hanger formed into a hook at its upper end to engage over the back of a vehicle seat, a support having an outstanding arm and an upstanding arm, the latter of which is adjustable on the hanger, means for maintaining said support at any selected point of adjustment and means carried by the hanger engageable with the seat to space the support from the seat.

2. An arm rest comprising, a hanger composed of a strap whose upper end is curved to engage over the top of the back rest of a vehicle seat, an L-shaped support having an upstanding arm provided with a bearing to receive the hanger, said hanger having side marginal teeth, a latch on the support which is engageable with said teeth to latch the arm support at any selected point of adjustment, and means on the support for releasing the latch to permit such adjustment.

3. An arm rest comprising, a strap of metal or the like formed into a shape to engage over the top of, and follow the contour of, the back of a motor vehicle seat, a covering of soft material on the upper end of the hanger, an arm support on the hanger beneath said covering, a laterally extended friction member on the lower end of the hanger engageable with the back of said seat to hold the lower end of the hanger out of contact with the seat.

4. An arm rest comprising, a strap of metal or the like formed into a shape to engage over the top of, and follow the contour of, the back of a motor vehicle seat, a covering of soft material on the upper end of the hanger, an arm support on the hanger beneath said covering, a laterally extended friction member on the lower end of the hanger between the hanger and back and spacing the uncovered portion of the hanger from the back, said arm support being adjustable on the hanger, and means for securing the arm support at any selected point of adjustment.

5. An arm rest comprising, a hanger formed into a hook at its upper end to engage over the back of a vehicle seat, an arm support adjustable on the hanger and having an outstanding arm to support the forearm and an upstanding support for the elbow means carried by the hanger below said outstanding arm for maintaining said upstanding support in spaced relation to the back of said seat, and means for maintaining said arm support at any selected point of adjustment on the hanger.

6. An arm rest comprising, a hanger formed into a hook at its upper end to engage over the back of a vehicle seat, an arm support adjustable on the hanger and having an outstanding arm to support the forearm and an upstanding support for the elbow, means for maintaining said arm support at any selected point of adjustment on the hanger, and a laterally extended friction member on the lower end of the hanger engageable with the back to maintain said arm support in spaced relation to the back.

JAMES W. SMITH.

REFERENCES CITED

The following references are of record in the file of this patent:

UNITED STATES PATENTS

| Number | Name | Date |
|---|---|---|
| 312,938 | Walter | Feb. 24, 1825 |
| 1,264,837 | Moden | Apr. 30, 1918 |
| 1,463,293 | Paddock | July 31, 1923 |
| 1,561,025 | Reimer | Nov. 10, 1925 |
| 1,925,523 | Cuff | Sept. 5, 1933 |